UNITED STATES PATENT OFFICE.

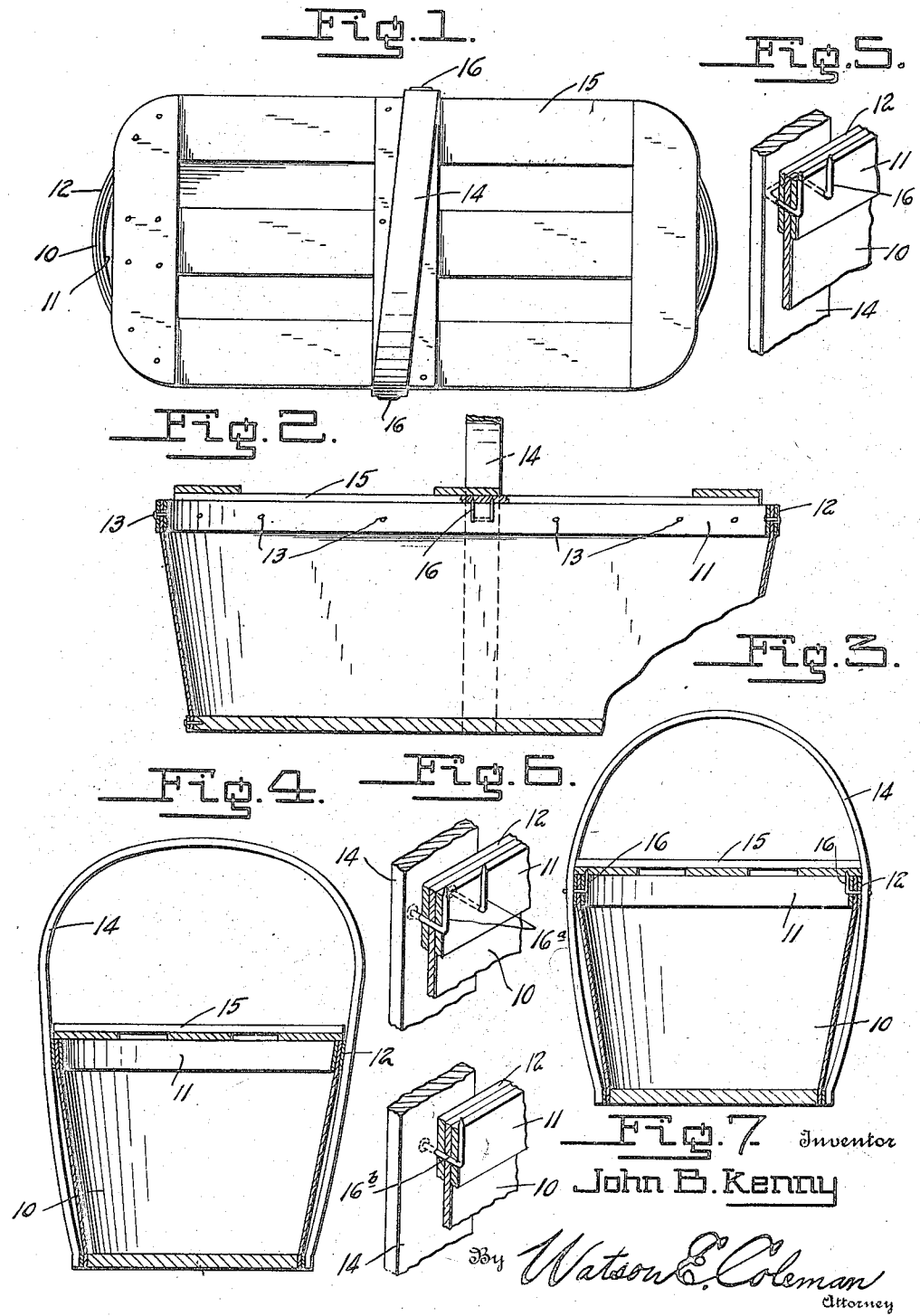

JOHN B. KENNY, OF GENEVA, NEW YORK.

FRUIT BASKET.

1,425,262.    Specification of Letters Patent.    Patented Aug. 8, 1922.

Application filed March 11, 1922. Serial No. 542,927.

*To all whom it may concern:*

Be it known that I, JOHN B. KENNY, a citizen of the United States, residing at Geneva, in the county of Ontario and State of New York, have invented certain new and useful Improvements in Fruit Baskets, of which the following is a specification, reference being had to the accompanying drawings.

This invention relates to fruit baskets, and particularly to means for holding the cover of a fruit basket in place.

In the ordinary fruit basket which is made of wood and has the bowed handle and a wooden cover, the handles are very seldom disposed with their legs exactly opposite to each other and exactly midway of the length of the basket. If the legs are disposed equidistantly and directly opposite each other, it is usually by accident, as the handles are nailed on to the side walls of the basket rapidly and carelessly.

The general object of this invention is to provide means whereby the wooden cover of the basket may be held from accidental longitudinal movement after it is put in place and whereby the handle of the basket will uphold a cover or lid from being accidentally lifted until the handle is forced downward to spread the side walls of the basket, thus permitting the cover to be slightly lifted and longitudinally shifted.

A further object is to provide very simple and cheap means for engaging the cover with the basket and preventing endwise movement.

My invention is illustrated in the accompanying drawings, wherein:—

Figure 1 is a top plan view of a basket constructed in accordance with my invention;

Figure 2 is a longitudinal sectional view of the basket;

Figure 3 is a cross section through the middle of the basket, the handle being shown in elevation;

Figure 4 is a like view to Figure 3, but showing the basket with a long handle which does not clamp the cover;

Figure 5 is a fragmentary sectional perspective through the handle and a portion of the side wall of the basket;

Figure 6 is a like view to Figure 5, but showing a modified form of cover-engaging means;

Figure 7 is a like view to Figure 6, but showing another modified form.

Referring to these drawings, 10 designates the body of the basket, which is made of thin wood or veneer, and formed in the usual manner. This basket forms no part of my invention. This basket at its upper margin is braced by reinforcing strips 11 and 12 which are held to the body of the basket by staples or other like fastening means 13. Attached to the body of the basket and arching thereover is a handle, designated 14. This handle is shown as being off center, that is it is not disposed with its two legs in diametrically opposed relation. These handles, as before stated, are carelessly applied, ordinarily, and as a consequence the legs may be off-set with relation to each other as much as an inch or more.

Adapted to rest upon the top of the basket is a lid or cover, designated 15, and which is shown as a slatted cover, though a solid wooden cover may be used if desired. So far I have described an ordinary fruit basket such as is commonly found on the market.

For the purpose of holding the cover against longitudinal movement after it is disposed upon the basket, I drive through the legs of the handle 14 and through the binding strips 11 and 12 the double pointed staples 16 and then turn the points of these staples upward so that these points will extend slightly above the upper margin of the basket. If now the wooden cover be put upon the basket and forced downward firmly, the points of the staples 16 will pierce the under side of the cover or lid and the cover will be held against endwise movement. It will be obvious that it does not matter how much the legs of the handle are off-set, the prongs formed by the double pointed staples 16 will still hold the cover from longitudinal movement.

Ordinarily, the handle 14 is of such length that it will project above the upper edge of the basket to such an extent that it will not prevent upward movement of the cover and as a consequence prevent the cover from being lifted off of the prongs 16. Ordinary standard size baskets are made with standard size handles. In other words, a twelve-quart basket has a handle having a length of approximately thirty inches. With a handle having a length of approximately thirty inches, the "spring" of the arch or bow of the handle is not located closely adjacent the upper edge of the basket but the point of the spring of the arch is disposed quite a little above the upper edge of the basket. As a consequence, such a handle will not prevent the upward movement of the cover. I illustrate such a basket with an ordinary handle in Figure 4.

To cause the handle of the basket to hold the lid in place from vertical movement, I use a shorter handle. In other words, for a twelve-quart size basket normally having a handle of thirty inches in length, I use a handle of twenty-eight inches. This brings the spring of the bow or arch of the handle very closely adjacent the upper edge of the basket, as illustrated in Figure 3, and as a consequence the upwardly converging legs of the handle bind upon the edge of the cover and prevent any upward movement of the cover, unless pressure is applied to the top of the handle, which acts to spread the sides of the basket and relieve the binding action between the handle and the edges of the cover.

While I have shown in Figure 5 a double pointed staple for holding the cover in place and forming two upwardly extending prongs, I do not wish to be limited to this as it is obvious that two sharp pointed nails of proper length, as illustrated in Figure 6, may be used, these nails being designated 16ª, or even one nail 16ᵇ, as illustrated in Figure 7, may be used. The staples or nails are driven through the handle and side wall of the basket and then upwardly turned to provide the upwardly extending prongs which, as before remarked, have their points extending slightly above the upper margin of the basket. Of course, it will be understood that the length of the handle before stated is approximate, but it is a necessary part of my invention that the handle should be of such size that when in place the spring of the arch portion of the handle will come approximately at the upper margin of the basket and will bind upon the cover and prevent the cover from being raised until the handle is forced down to spread the sides of the basket.

Of course, it will be understood that the means for holding the cover from longitudinal movement, namely the staples or nails 16 or 16ª, can be used with handles of such length that they do not hold the cover firmly in place against upward movement. In this case the cover is held from endwise movement but not from vertical movement, but obviously the best results are obtained with a handle which will normally prevent this upward movement of the cover. It will be seen that no special cover is necessary. The covers may be either slatted or solid and may be made without special reference to the fastening devices. Ordinarily, the covers on these fruit baskets are fastened down by hooks, and my invention saves not only the cost of the hooks and the cost of the labor in attaching the hooks, but also saves approximately two inches of handle material, or a length of material equal to seventy-two handles out of every one thousand handles cut. This saving is very appreciable where large quantities of fruit are packed and shipped.

It will be seen that the staples perform double duty, in that they firmly attach the handle to the basket, hold the outside and inside bands attached to the basket, besides securely fastening the cover against endwise movement, whether the handle is properly centered on the basket or not. My invention further permits the use of the ordinary covers which fruit growers usually have on hand in large quantities.

I claim:—

1. A fruit basket having a handle arching over the basket, a cover for the basket, and means for holding the cover from endwise movement comprising upwardly extending prongs projecting upward from the inside of the basket adjacent its upper edge and adapted to engage in the cover.

2. A fruit basket having a handle arching over the basket, the opposite side walls of the basket adjacent the handle being provided on their inside faces adjacent their upper edges with upwardly extending prongs and projecting slightly above the upper edge of the basket wall, the legs of said handle converging upward immediately above the upper edge of the basket whereby to prevent upward movement of the cover.

3. A fruit basket having a handle arching over the middle of the basket and attached to the side walls thereof, and sharp pointed members inserted through the legs of the handle and the upper margins of the side walls of the basket and upwardly turned to project slightly above said side walls to thereby engage the lid of the basket.

4. A fruit basket having side walls and sharp pointed members inserted through the upper margins of the side walls and having their points turned upward inside the side walls and projecting slightly above the upper margin of the side walls and being thereby adapted to hold the cover in place.

5. A fruit basket having reinforcing strips applied to the outside and inside faces at its upper margin, a handle arching over the basket and attached to the side walls thereof, and sharp pointed members disposed through said handles and said strips at the upper margin of the basket and turned upward and projecting slightly above the upper margin of the basket to thereby engage the cover and hold it in place.

6. A fruit basket having reinforcing strips applied to its outer and inner faces at the upper edge of the basket, a handle arching over the basket and having its legs attached to the side walls thereof, and sharp pointed members disposed through the handle and through the reinforced upper margin of the basket, the inner ends of the sharp pointed members being turned upward and adapted to engage a cover, the handle having its legs converging upwardly immediately above the upper edge of the basket whereby to hold the cover from upward movement.

7. A fruit basket having reinforcing strips applied to its outer and inner faces adjacent the upper edge of the basket, a handle arching over the basket and having its legs attached to the side walls thereof, double pointed staples disposed through the handle and through the reinforced upper edge of the basket, the inner ends of the staples extending upward and the points of the staples being disposed slightly above the upper edge of the basket and adapted to engage a cover.

In testimony whereof I hereunto affix my signature.

JOHN B. KENNY.